United States Patent [19]

Greaves et al.

[11] Patent Number: 5,065,231
[45] Date of Patent: Nov. 12, 1991

[54] APPARATUS AND METHOD FOR MERGING INPUT RGB AND COMPOSITE VIDEO SIGNALS TO PROVIDE BOTH RGB AND COMPOSITE MERGED VIDEO OUTPUTS

[75] Inventors: Paul E. Greaves, Rancho Cordova; Michael R. Moore, Folsom; Stephen G. Perlman, Mountain View; Laurence A. Thompson, Saratoga, all of Calif.

[73] Assignee: Apple Computer, Inc., Cupertino, Calif.

[21] Appl. No.: 649,605

[22] Filed: Feb. 1, 1991

Related U.S. Application Data

[62] Division of Ser. No. 249,603, Sep. 26, 1988, abandoned.

[51] Int. Cl.⁵ .................. H04N 9/74; H04N 5/262; H04N 5/272; G09G 1/14
[52] U.S. Cl. ..................... 358/22; 358/183; 340/734
[58] Field of Search ............. 358/31, 183, 22; 340/734

[56] References Cited

U.S. PATENT DOCUMENTS

| | | | |
|---|---|---|---|
| 4,498,098 | 2/1985 | Stell | 358/310 |
| 4,639,765 | 1/1987 | D'Hont | 358/22 |
| 4,768,083 | 8/1988 | Bomesburg | 358/183 |
| 4,890,162 | 12/1989 | McNeeley et al. | 358/183 |

Primary Examiner—James J. Groody
Assistant Examiner—Wendy R. Greening
Attorney, Agent, or Firm—Blakely, Sokoloff, Taylor & Zafman

[57] ABSTRACT

A circuit which receives RGB and composite video and provides both RGB and composite merged outputs. Merging of RGB signals occur where the input composite signal is converted to RGB; and also, merging occurs of composite signals where the input RGB is converted to a composite signal. The circuit is particularly useful in a video overlay application. Notch filters are used both in the video path and keying path. The notch filters are centered at frequencies equal to the dot clock frequency of the RGB divided by integers where the result of this division falls within the chroma subcarrier spectrum.

10 Claims, 2 Drawing Sheets

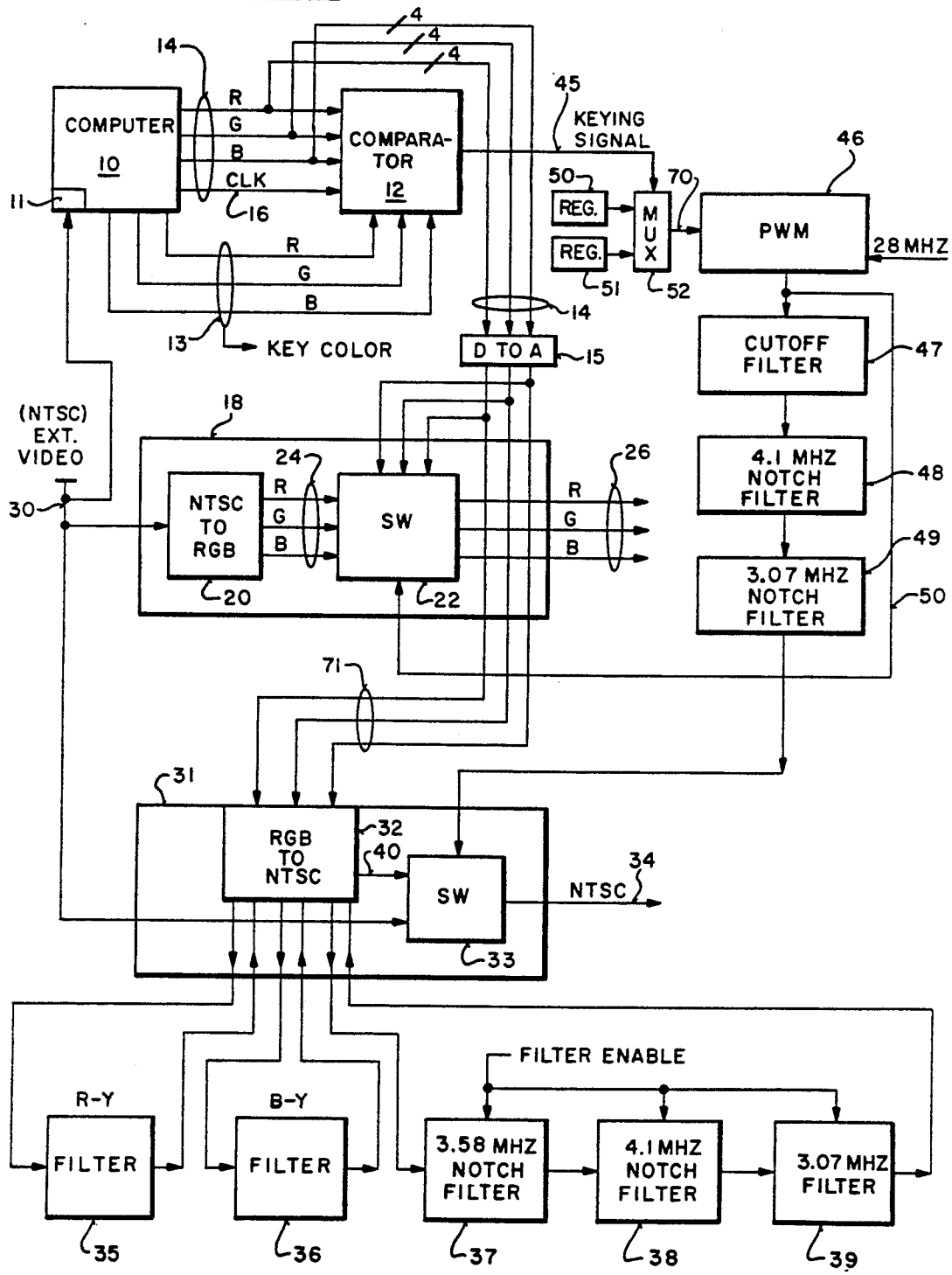

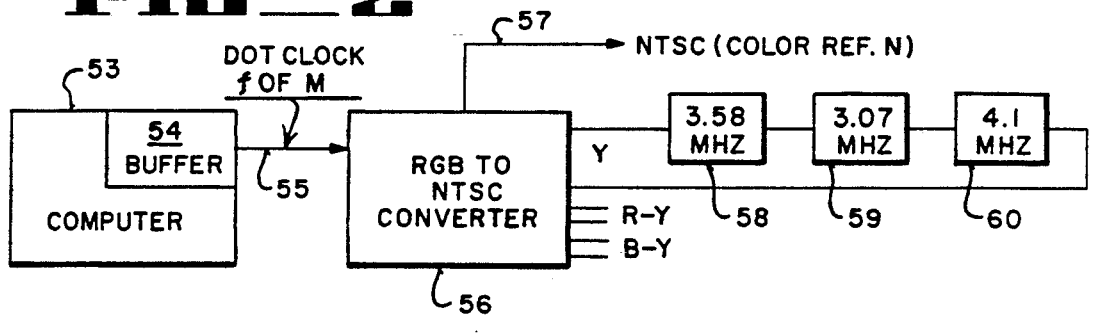
FIG_2
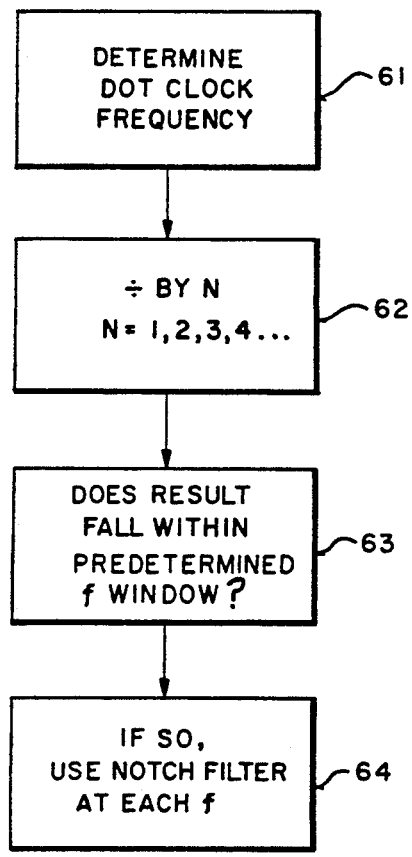
FIG 3A
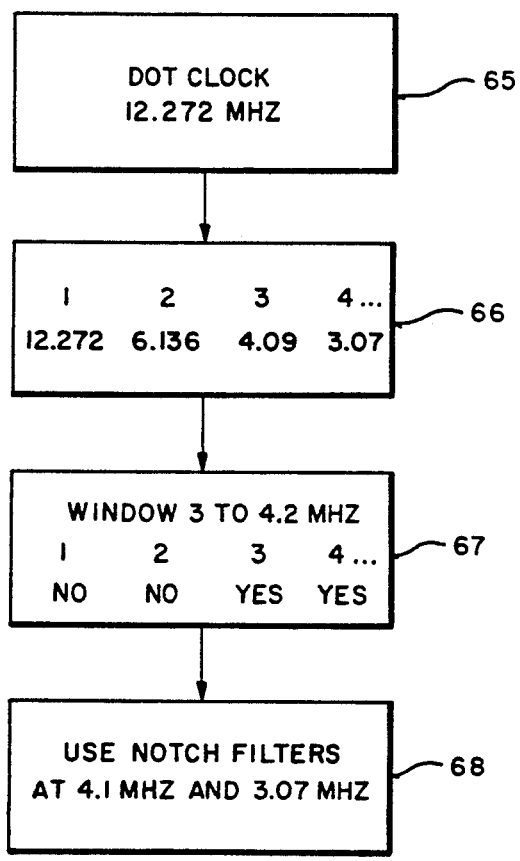
FIG 3B

APPARATUS AND METHOD FOR MERGING INPUT RGB AND COMPOSITE VIDEO SIGNALS TO PROVIDE BOTH RGB AND COMPOSITE MERGED VIDEO OUTPUTS

This is a divisional of application Ser. No. 07/249,603, filed Sep. 26, 1988 now abandoned.

BACKGROUND OF THE INVENTION

1. Field of the Invention

The invention relates to the field of converting RGB signals into a composite video signal, and its use in video overlays.

2. Prior Art

Some commercially available computers, particularly personal computers, provide circuitry which permits the merger of a composite video signal (e.g., NTSC signal, more specifically Proposed Standard E1A RS-170A) with a computer generated video graphics display, typically red, green, blue (RGB) signals. The RGB signals may represent a video overlay such as text intended to be displayed with the composite video signal. In a typical application an NTSC signal from a broadcasting station, video disk or tape, or other source of a composite video signal is merged with the signal representing the video overlay to provide, for example, titles or subtitles over a background image represented by the composite signal.

Often, in the prior art, the signal representing the overlay image is stored in a frame buffer. The portion of this overlay image in which the background image from the composite signal is to show through is assigned a "key color" in the buffer which is distinct from any other color in the overlay image. The buffer is then scanned out synchronously with the composite video signal and the contents of the buffer are compared, pixel by pixel, with the "key color". When the comparator indicates that the portion of the buffer being scanned out contains the "key color", a switch selects the composite video signal to be the output signal. On the other hand, when other than the "key color" is scanned in the buffer (indicating that the overlay image is being scanned) a signal from the comparator (key or keying signal) causes the switch to select the contents of the buffer. This arrangement permits the overlay image to be shown in all colors which the buffer can store, except for the "key color".

The frame buffer stores the overlay signal in digital form (e.g., RGB or an index to an RGB lookup table). The RGB signal is converted to a composite overlay signal before being coupled to the switch, thus, the switch selects between first and second analog signals. In another prior art arrangement, the composite video signal is converted to an RGB signal and the switch selects between first and second RGB signals.

Commercially available integrated circuits are used to perform the above described functions, such as MC 1378 and TDA 3301, both manufactured by Motorola Semiconductor, Inc. Phase locked loops are used to synchronize the scanning of the frame buffer with the composite video signal.

In many applications it is desirable to provide both merged RGB signals and a merged composite video signal. This allows a user to record the composite video signal while monitoring the merged images on an RGB monitor. One prior art circuit for providing both output signals first converts the composite video into an RGB signal and then merges two RGB signals. The results of this merger provide first output RGB signals. A second composite output signal is provided by converting the merged RGB signal into a composite video signal. This arrangement provides a relatively poor second video output signal that results from the second conversion. Note that there is, in effect, a "serial" double conversion, and the second conversion provides relatively poor video because there is unavoidable signal distortion from each conversion step. As will be seen with the present invention a double merging (not a double, serial conversion) is used to solve this problem and thereby providing both high quality RGB and composite signal outputs.

Video artifacts are known to occur where computer generated images are displayed on composite video monitors. These artifacts are caused in part by high frequency video signals "chroma crosstalk" that occur at the color reference frequency of 3.58 MHz for NTSC signals. There are numerous filters used that attempt to remove these artifacts. Often, a 3.58 MHz notch filter is used to prefilter the luminance component of an NTSC signal. Applicant believes that lowpass filters may be used in the prior art to remove all chroma signals, for example, above 3.0 MHz. This eliminates the artifacts but at the cost of destroying some of the image sharpness.

It has been found that when the frequency of the dot clock associated with RGB signals is not a harmonic of the color reference frequency, color artifacts appear when the signal is converted to composite video despite the presence of a 3.58 MHz notch filter. The present invention solves this problem by using additional notch filters including notch filters to filter the keying signal.

SUMMARY OF THE INVENTION

An improvement in an apparatus which converts RGB signals into a composite video signal is disclosed. Notch filters are used centered at certain frequencies. These frequencies are equal to the dot clock frequency of the RGB signal divided by integers provided that the frequency resulting from this division falls within the chroma subcarrier spectrum.

This improvement is used in an apparatus for providing video output signals containing a composite video signal merged with first RGB video overlay signals. A keying signal generation means provides a keying signal indicating when the image represented by the video overlay signal overlies the image represented by the composite video signal. A first converter converts the video composite signal into second RGB signals. A second converter is used to convert the first RGB signals into a composite overlay signal using notch filters to filter the luminance signal in the conversion process. Merging occurs in both a first and a second switch. A first switch under control of the keying signal selects between the first and second RGB signals. In a second switch the keying signal, filtered by notch filters, is used to select between the composite video signal and the composite overlay signal.

Other aspects of the present invention will be apparent from the detailed description of the invention.

BRIEF DESCRIPTION OF THE DRAWINGS

FIG. 1 is an electrical schematic of the presently preferred embodiment of the invention.

FIG. 2 is a general block diagram illustrating one aspect of the present invention.

FIG. 3a is a flow diagram illustrating the steps used to implement one aspect of the present invention.

FIG. 3b is a flow diagram illustrating a specific example for determining the frequency of notches for notch filters based on the flow diagram of FIG. 3a.

DETAILED DESCRIPTION OF THE PRESENT INVENTION

The presently preferred embodiment of the present invention is an apparatus for providing output video signals which represent a composite video signal merged with a video overlay signal. This preferred embodiment as well as other aspects of the present invention are described below. In the following description numerous specific details are set forth such as specific frequencies in order to provide a thorough understanding of the present invention. It will be obvious, however, to one skilled in the art that these specific details need not be employed to practice the present invention. In other instances, well-known circuits are shown in block diagram form in order not to unnecessarily obscure the present invention.

Referring first to FIG. 2, a computer 53 is shown which includes a memory or buffer 54. This computer may be any one of several commercially available computers including personal computers. Buffer 54 is typically the randomaccess memory (RAM) of the computer, and for purposes of discussion, this buffer is referred to as a "frame buffer" in that it stores one frame of video information. Digital signals representing color data such as red, green, blue (RGB) data is stored for each pixel of the display. In some cases indexes are stored in the frame buffer; these indexes point to colors in a color look-up table.

It is sometimes necessary to convert the digital (RGB) video signals into a composite video signal. This is typically done by reading the data from the buffer 54 in synchronous with the color reference frequency associated with the composite video signal. The RGB signals are then converted to a composite video format such as that used in the U.S.A. (NTSC). The converter 56 of FIG. 2 performs this function. Commercially available circuits are used to convert the RGB signals to NTSC signals such as the Motorola, Inc. MC1377. These commercially available circuits include taps which allow filters to be added to the R-Y, B-Y and Y(luminance) signals. Typically, a 3.58 MHz notch filter 58 is used to filter the luminance signal to reduce color artifacts that result when Y, R-Y and B-Y are converted into a composite signal. These color artifacts result from high frequency luminance signals that fall within the capture range (i.e., the chroma subcarrier spectrum) of the color decoder circuit of the NTSC receiver (approximately between 3.0 to 4.2 MHz). Although the luminance signal is intended to carry only monochromatic information, the color decoder will interpret any energy in the chroma subcarrier spectrum to be chroma information and will display color artifacts (i.e., wrong colors) from luminance information within this range of frequencies. As will be seen with the teachings of the present invention, additional notch filters are used such as filters 59 and 60 shown coupled in series with the filter 58 to eliminate luminance energy in the chroma spectrum that will result in a visible color artifact.

The chroma subcarrier spectrum may be considered to be the frequency band over which visible artifacts are produced on a display. This, to some extent, will vary from display-to-display and as a function of individual eyesight. For present purposes, the chroma subcarrier spectrum is assumed to be between 3.0–4.2 MHz for an NTSC signal.

The rate at which the pixel data is read from the frame buffer 54 and coupled onto line 55 for conversion by the converter 56 is referred to as the dot clock frequency. This is shown as frequency M in FIG. 2. The period of this frequency corresponds to the horizontal line frequency of the composite video signal less the horizontal blanking interval divided by the number of pixels stored for each line in buffer 54. This number may not be a harmonic of the color reference frequency associated with the composite video signal (N=3.58 MHz for NTSC), but it typically is phased locked to that frequency (e.g., 12.272 MHz is 24/7 of 3.58 MHz).

The present invention teaches the use of notch filters to remove certain frequencies from the luminance component of the composite signal which result from the dot clock frequency.

More specifically, referring to FIG. 3a, first the dot clock frequency is determined as shown by block 61. Next, this frequency is divided by the integers 1, 2, 3, 4, etc. Each of the quotients are then examined to determine if they fall within a predetermined frequency window (block 63). This is the window defined by the chroma subcarrier reference spectrum. For an NTSC signal having a color reference frequency of 3.85 MHz, the range is approximately between 3–4.2 MHz. A notch filter is used for each of the quotients that fall within the predetermined window. Each of these filters has a notch centered at the frequency equal to the quotient.

A typical example is shown in FIG. 3b. Assume that the dot clock frequency is equal to 12.272 MHz as shown by block 65. This number is divided by 1, 2, 3, 4, etc. giving the quotients 12.272, 6.136, 4.09, 3.07, etc., as shown in block 66.

Next, as shown by block 67, each of the quotients are examined to determine if they fall within the range of 3.0–4.2 MHz. For the integer 1, 12.272 falls outside this window. This also true for the integer 2. For the integers 3 and 4, the quotients fall within the range of 3.0–4.2 MHz. For integers 5 and larger, the quotients fall below the lower frequency of the window and hence, notch filters are not required for these frequencies.

Now, as shown by block 68, notch filters are used where the characteristic of the filter has a notch centered at 4.1 MHz and 3.07 MHz. Referring to FIG. 2, the filter 59 has a notch centered at 3.07 MHz and the filter 60 has a notch centered at 4.1 MHz. These filters are used in addition to the often used notch filter having a notch located at the color reference frequency at 3.58 MHz.

The use of the notch filters 59 and 60 has been found to remove artifacts not removed by filter 58. As will be seen in the presently preferred embodiment, the notch filters are also used to filter the keying signal associated with a video overlay.

The notch filters used in the presently preferred embodiment are ordinary filters fabricated from discrete, passive components. The filters provide approximately 35 dB attenuation at their center frequency and have a Q of approximately 1.9.

PRESENTLY PREFERRED EMBODIMENT OF THE INVENTION

Referring to FIG. 1, a computer 10 is illustrated which may be any one of a plurality of commercially available computers such as the Apple II computer. The computer includes a memory which is used as a frame buffer. A user may enter into this frame buffer signals representing an image (overlay image) which is displayed in conjunction with another image. This other image is illustrated as an NTSC (external) video signal (composite video signal) applied to line 30. The signal on line 30 may be received from a TV broadcasting station, video disk, video tape, another computer, or other source of composite video signal.

The external video signal on line 30 is shown coupled to a circuit 11 within computer 10. This circuit provides synchronization signals to determine the rate at which data is read from the frame buffer onto lines 14. This is the dot clock frequency M previously discussed in conjunction with FIG. 2. This dot clock is coupled to the comparator 12 on line 16 as illustrated in FIG. 1.

Generally for a video overlay, the frame buffer in the computer 10 stores the overlay image in any color except for one color referred to the as the key color. The key color is stored in all other pixel locations. The key color is coupled to the comparator 12 by lines 13 as illustrated in FIG. 1. On a pixel-by-pixel basis, the key color is compared to the contents of the frame buffer as the color data is read from the frame buffer. When the key color is not the same color as contained in the frame buffer, the overlay is displayed and the comparator 12 provides a keying signal on line 45. This is a common prior art technique. (In some cases, indices to colors in a color lookup table are stored in the frame buffer.)

The comparison shown in FIG. 1 within comparator 12 is a digital comparison. The digital RGB signals (both the signals on line 14 and the key color) can be converted to analog form and the comparison done by comparing two analog signals. As illustrated the digital signals on lines 14 (four bits for each color) are converted to analog form (one analog signal for red, one for green and one for blue) by converters 15 and then coupled to switch 22 and connector 32. This conversion, however, is not done for the comparison function.

The keying signal on line 45 controls a pulse width modulated signal generated by an ordinary gating means (modulator 46) so as to provide blending (fading) between the overlay image and the external video image. Registers 50 and 51, writable by the computer 10, each store a 4 bit code that indicates the level of blending for each state, 0 or 1, of keying signal 45. A multiplexer 52, controlled by the keying signal 45, selects between the output codes of registers 50 and 51 and couples the selected code through lines 70 to the modulator 46. A signal of approximately 28 MHz is coupled to the modulator 46 as the pulse width clock and the modulator 46 generates a pulse width modulated signal of a duty cycle specified by the code on lines 70. The presently preferred embodiment supports pulse width modulation duty cycles of 0%/100%, 12.5%/87.5%, 25%/75%, 50%/50%, 75%/25%, 87.5%/12.5%, and 100%/0%.

The pulse width modulated signal generated by modulator 46 is the switching signal used by the present invention to select between the overlay image and the external video image. Since the pulse width modulation can provide a rapid switching between the two images, it is possible to create the illusion of a weighted blending (fading) between the two images. For example, if the duty cycle of the pulse width modulation is 25%/75%, then a blending of 25% of one image and 75% of the other image is achieved. The two fade registers 50 and 51 provide for a different blend weighting for each state of the keying signal. For simple keying with "fading turned off" the code in fade register 50 is set to 100%/0% blending and the code in fade register 51 is set to 0%/100% blending.

To reduce aliasing of the pulse width modulation of modulator 46 with image patterns in the overlay image, the pulse width modulation phase can be inverted each video field, and inverted again each video frame. This causes the overlay image and external video image keying pattern to alternate by video line and by video frame for an enhanced blending effect.

The keying signal is coupled to switch 22 and, after being filtered by a cutoff filter 47, is coupled to filters 48 and 49. The filters 48 and 49 have the center frequencies of their notches located at 4.1 MHz and 3.07 MHz as taught by the present invention and described in conjunction with FIGS. 2 and 3. The filtering of the keying signal has been found to reduce artifacts.

In accordance with the present invention, two merging switches are used to merge the external video signal on line 30 with the overlay signal. In a first circuit 18, the external video signal is converted from its NTSC format (or other composite format) to RGB signals by a converter 20. The RGB signals resulting from this conversion (three analog signals) are connected to a first switch 22 via lines 24. Switch 22 selects between the output of the converter 20 and the RGB signals representing the video overlay from the computer 10. The outputs of switch 22 are merged RGB analog signals on lines 26. That is, the signals on line 26 contain, from a viewing standpoint, the external video image overlayed with the overlay image from the computer 10.

Circuit 18 may be a commercially available part, such as Motorola TDA3301. For this commercial part the switch 22 selects either the signals on lines 14 or 24 (not a blend of both) and for this reason the output of a pulse width modulator 46 is used to provide the fading.

A second circuit 31 includes a converter 32 which converts the RGB signals on lines 72 to an NTSC signal on line 40. The switch 33 selects between the composite signals on lines 30 and 40. The merged output composite signal on line 34 represents the same image as the image represented by the signals on line 26.

The circuit 32 may be a commercially available circuit such as the Motorola MC1378. For this circuit, the switch 33 is not "discrete", that is, depending on the level of the control signal to the switch, both composite input signals can be simultaneously selected, thereby providing blending between the signals. For this reason, the keying signal from the pulse width modulator 46 is first coupled to a cutoff filter 47 which effectively converts the pulse width modulated signal to an analog control signal for the switch 33. This keying signal is then coupled to filters 48 and 49 as discussed in conjunction with FIG. 2 and 3. The output of the filter 49 provides a control signal for the switch 33.

The circuit of FIG. 1 provides both an RGB and composite video output signals (lines 26 and 34, respectively). Importantly, it should be noted that no portion of the signals on lines 26 have been twice converted and the same is true for the NTSC signal on line 34. In the prior art, the double merging provided by switches 22 and 33 was not employed.

The converter 32 provides terminals to which filters may be coupled. The filters 35, 36 and 37 are ordinary filters which are coupled to the R-Y, B-Y and Y terminals. Additionally, as discussed previously, with the present invention, additional notch filters 38 and 39 are used to filter the luminance component of the composite signal. These filters provide notches centered at 4.1 and 3.07 MHz for an NTSC signal where the dot clock frequency is equal to 12.272 MHz.

For some video signals artifacts may not appear because of the very nature of the image/colors defined by the signal (e.g., black and white signal). In these cases, it may be desirable to disable particularly filters 37, 38 and 39 to maximize bandwidth. A filter enable signal is shown coupled to these filters to allow, for example, the manual selection/deselection of the filters.

Thus, an apparatus has been described which provides improved conversion of a computer generated RGB signal to a composite signal. In the presently preferred embodiment, this improved conversion is used as part of a video overlay apparatus which has both an NTSC and RGB outputs.

We claim:

1. An apparatus for providing output video signals which represent a composite video signal merged with first red, green, and blue (first RGB) video overlay signals comprising:

keying signal generation means for generating a keying signal which indicates when the image represented by said video overlay signal overlies the image represented by said composite video signal, said keying signal generation means being coupled to receive said first RGB signals;

first conversion means for converting said composite video signal into second RGB signals, said first conversion means being coupled to receive said composite video signal;

second conversion means for converting said first RGB signals into a composite overlay signal, said second conversion means being coupled to receive said first RGB signals;

first switching means for switching between said first RGB signals and said second RGB signals under control of said keying signal, said first switching means being coupled to said keying signal generation means and said first conversion means, said first switching means providing first output signals;

second switching means for switching between said composite video signal and said composite overlay signal under control of said keying signal, said second switching means being coupled to said second conversion means and said keying signal generation means, said second switching means providing a second output signal.

2. The apparatus defined by claim 1 wherein said composite video signal and said second output signal are NTSC signals.

3. The apparatus defined by claim 2 including pulse width modulation means for pulse width modulating said keying signal, said pulse width modulation means being coupled to said keying signal generation means, the output of said pulse width modulation means being coupled to at least said first switching means.

4. The apparatus defined by claim 3 including a filter for converting the output of said pulse width modulation means into an analog signal for coupling to said second switching means.

5. The apparatus defined by claim 1 wherein a dot clock frequency is associated with said first RGB signals and wherein, said apparatus includes at least one notch filter in said second conversion means, said notch being centered at a frequency equal to said frequency of said dot clock divided by an integer.

6. The apparatus defined by claim 1 wherein a dot clock frequency associated with said first RGB signals and wherein said apparatus includes at least one notch filter coupled to said keying signal generation means, said notch being centered at a frequency equal to said frequency of said dot clock divided by an integer.

7. In an apparatus for merging a composite video signal having a color reference frequency of N with a video overlay signal having a dot clock frequency of M where M is not a harmonic of N, an improvement comprising:

a filter coupled to receive and filter at least one component of said video overlay signal, said filter having a frequency characteristic which has a notch centered at a frequency approximately equal to M divided by an integer.

8. The improvement defined by claim 7 wherein said filter filters the luminance component of said video overlay signal.

9. In an apparatus for merging a composite video signal having a color reference frequency N with a video overlay signal having a dot clock frequency M, where M is not a harmonic of N, an improved method comprising the steps of:

(a) dividing M by the integers 1, 2, 3, . . . ; and, (b) providing a notch filter having a notch centered at the ones of the frequencies of the quotients from step (a) which fall within the chroma subcarrier reference spectrum associated with said color reference frequency N.

10. In an apparatus for converting RGB signals having a dot frequency of M into a composite video signal having a color reference frequency N, where M is not a harmonic of M, an improved method comprising the steps of:

(a) dividing M by the integers 1, 2, 3 . . . ; and, (b) providing a notch filter having a notch centered at said frequencies of the quotients from step (a) which fall within the chroma subcarrier reference spectrum associated with said color reference frequency M.

* * * * *